(12) United States Patent
Ni et al.

(10) Patent No.: US 11,451,927 B2
(45) Date of Patent: Sep. 20, 2022

(54) POSITIONING METHOD, POSITIONING APPARATUS, SERVER, AND COMPUTER-READABLE STORAGE MEDIUM

(71) Applicant: TENCENT TECHNOLOGY (SHENZHEN) COMPANY LIMITED, Shenzhen (CN)

(72) Inventors: Jiazhi Ni, Shenzhen (CN); Xin Li, Shenzhen (CN); Chang Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 55 days.

(21) Appl. No.: 16/893,095

(22) Filed: Jun. 4, 2020

(65) Prior Publication Data
US 2020/0304954 A1    Sep. 24, 2020

Related U.S. Application Data

(63) Continuation of application No. PCT/CN2019/075326, filed on Feb. 18, 2019.

(30) Foreign Application Priority Data

Mar. 5, 2018 (CN) .......................... 201810178057.9

(51) Int. Cl.
*H04W 4/029* (2018.01)
(52) U.S. Cl.
CPC .................................. *H04W 4/029* (2018.02)
(58) Field of Classification Search
CPC ............ G01S 5/02524; G01S 5/02527; H04W 48/16; H04W 4/029; H04W 64/00
See application file for complete search history.

(56) References Cited

U.S. PATENT DOCUMENTS

| 2013/0143588 A1* | 6/2013 | Flanagan .............. G01S 5/0252 455/456.1 |
| 2013/0244692 A1 | 9/2013 | Kelly et al. |

(Continued)

FOREIGN PATENT DOCUMENTS

| CN | 102098780 A | 6/2011 |
| CN | 103098506 | 5/2013 |

(Continued)

OTHER PUBLICATIONS

Xin et al (CN102098780A) Jun. 15, 2011 (Machine Translation). (Year: 2013).*

(Continued)

*Primary Examiner* — Liton Miah
(74) *Attorney, Agent, or Firm* — ArentFox Schiff LLP

(57) ABSTRACT

To perform positioning by a computing device, a position request transmitted by a terminal is received. The positioning request includes target access point information obtained by the terminal. Then a plurality of first geographic grids related to a location of the terminal is determined based on the target access point information. A positioning sequence of the plurality of first geographic grids is determined according to access point information corresponding to the plurality of first geographic grids and the target access point information. The positioning sequence indicates distances between the plurality of first geographic grids and the terminal. The location of the terminal is then determined based on the positioning sequence of the plurality of first geographic grids and location information of the plurality of first geographic grids.

20 Claims, 11 Drawing Sheets

(56) References Cited

U.S. PATENT DOCUMENTS

| | | | |
|---|---|---|---|
| 2016/0014570 A1 | 1/2016 | Wuoti et al. | |
| 2017/0134899 A1* | 5/2017 | Chan | H04W 64/00 |
| 2017/0142684 A1* | 5/2017 | Bhatt | H04B 17/318 |
| 2019/0200318 A1* | 6/2019 | Wirola | H04W 64/003 |
| 2020/0314792 A1* | 10/2020 | Wang | H04B 7/063 |

FOREIGN PATENT DOCUMENTS

| | | |
|---|---|---|
| CN | 103917887 A | 7/2014 |
| CN | 104186016 | 12/2014 |
| CN | 105282758 A | 1/2016 |
| CN | 106507475 | 3/2017 |
| CN | 106851571 | 6/2017 |
| CN | 107517446 A | 12/2017 |
| WO | WO 2017/020273 A1 | 2/2017 |

OTHER PUBLICATIONS

PCT International Search Report with Written Opinion of National Intellectual Property Administration, PRC (ISA/CN) dated Apr. 17, 2019 in PCT/CN2019/075326 with translation of the International Search Report.
Chinese Office Action dated Mar. 31, 2021 in Chinese Application No. 201810178057.9 (with Concise English Translation).
Extended European Search Report dated Apr. 20, 2021 in European Application No. 19763605.3.
Communication Pursuant to Rules 70(2) and 70a(2) EPC dated May 10, 2021 in European Application No. 19763605.3.

\* cited by examiner

POSITIONING METHOD, POSITIONING APPARATUS, SERVER, AND COMPUTER-READABLE STORAGE MEDIUM

RELATED APPLICATION

This application is a continuation application of International Application No. PCT/CN2019/075326, filed on Feb. 18, 2019, which claims priority to Chinese Patent Application No. 201810178057.9, entitled "POSITIONING METHOD, POSITIONING APPARATUS, SERVER, AND COMPUTER-READABLE STORAGE MEDIUM" and filed on Mar. 5, 2018. The entire disclosures of the prior applications are hereby incorporated by reference in their entirety.

FIELD OF THE TECHNOLOGY

Exemplary embodiments of the present disclosure relate to the field of information technologies.

BACKGROUND OF THE DISCLOSURE

A positioning service is a basic and important part in location-based services. A related positioning service is based on base station positioning and global positioning system (GPS) positioning. The base station positioning has a relatively large positioning error due to a relatively fixed location of a base station. The GPS positioning has a higher positioning precision than that of base station positioning, but GPS positioning needs a longer start time than base station positioning, and is ineffective indoors. With the development of information technologies, coverage of Wi-Fi hotspots has increased dramatically. Positioning using Wi-Fi hotspot locations effectively remedies disadvantages of the foregoing two positioning methods, making it one of the mainstream positioning technologies.

SUMMARY

Exemplary embodiments of this application provide a positioning method, a positioning apparatus, a server, and a non-transitory computer-readable storage medium. The technical solutions are as follows.

In exemplary aspects, a positioning method, performed by a computing device, includes receiving, by circuitry, a positioning request transmitted by a terminal. The positioning request including target access point information obtained by the terminal. Then a plurality of first geographic grids related to a location of the terminal is determined by the circuitry according to the target access point information. A positioning sequence of the plurality of first geographic grids is determined by the circuitry according to access point information corresponding to the plurality of first geographic grids and the target access point information. The positioning sequence indicates distances between the plurality of first geographic grids and the terminal. The location of the terminal is determined by the circuitry according to the positioning sequence of the plurality of first geographic grids and location information of the plurality of first geographic grids.

In exemplary aspects, the determining of the plurality of first geographic grids related to the location of the terminal includes, for at least one geographic grid of a plurality of geographic grids, determining the at least one geographic grid as one of the plurality of first geographic grids in a case that access point identifiers in access point information corresponding to the at least one geographic grid and access point identifiers in the target access point information include at least one same access point identifier.

In exemplary aspects, the determining of the positioning sequence of the plurality of first geographic grids includes generating a plurality of positioning samples according to the access point information corresponding to the plurality of first geographic grids and the target access point information. Each of the plurality of positioning samples corresponding to two of the plurality of first geographic grids. The positioning sequence of the plurality of first geographic grids is then determined according to the plurality of positioning samples by using a specified ranker.

In exemplary aspects, the generating of the plurality of positioning samples includes determining positioning features of the first geographic grids according to the access point information corresponding to the first geographic grids and the target access point information, and, for any two of the plurality of first geographic grids, generating, according to positioning features of the two first geographic grids, a positioning sample corresponding to the two first geographic grids.

In exemplary aspects, before the determining of the positioning sequence of the plurality of first geographic grids, a plurality of first positioning requests is obtained. The plurality of first positioning requests includes access point information and location information. A plurality of training samples are generated according to access point information corresponding to the plurality of geographic grids, location information of the plurality of geographic grids, and the access point information and the location information that are carried in the plurality of first positioning requests. Each of the plurality of training samples corresponding to two of the plurality of geographic grid. Using the plurality of training samples to train a to-be-trained ranking model, the specified ranker is obtained.

According to exemplary aspects, the generating of the plurality of training samples includes selecting a first positioning request from the plurality of first positioning requests. For each selected first positioning request the method further includes for at least one of the plurality of geographic grids, determining the at least one geographic grid as a second geographic grid in a case that access point identifiers in access point information corresponding to the geographic grid and access point identifiers in access point information carried in the selected first positioning request comprise at least one same access point identifier. Positioning features of the second geographic grids are determined according to access point information corresponding to each of a plurality of determined second geographic grids and the access point information in the selected first positioning request. For any two of the plurality of second geographic grids, a category corresponding to the two second geographic grids is determined according to location information of the any two second geographic grids and location information carried in the selected first positioning request. A training sample corresponding to the second geographic grids are generated according to the category corresponding to the any two second geographic grids and positioning features of the two second geographic grids.

According to exemplary aspects, a plurality of second positioning requests is obtained. The plurality of second positioning requests includes access point information and location information. Geographic grids to which the second positioning requests belong from the plurality of geographic grids are determined according to the location information in the second positioning requests and the location information of the plurality of geographic grids. Access point information corresponding to the geographic grids is determined according to access point information in the second positioning requests belonging to the geographic grids.

In exemplary aspects, the determining of the location of the terminal includes selecting a first n first geographic grids from the plurality of first geographic grids according to the positioning sequence of the plurality of first geographic grids, where n is a positive integer. The location of the terminal is then determined according to location information of the n first geographic grids.

In exemplary aspects, the terminal obtains the target access point information through scanning.

In exemplary aspects, a positioning apparatus includes circuitry configured to receive a positioning request transmitted by a terminal. The positioning request includes target access point information obtained by the terminal. The circuitry determines, according to the target access point information, a plurality of first geographic grids related to a location of the terminal. The circuitry determines a positioning sequence of the plurality of first geographic grids according to access point information corresponding to the plurality of first geographic grids and the target access point information. The positioning sequence indicates distances between the plurality of first geographic grids and the terminal. The circuitry determines the location of the terminal according to the positioning sequence of the plurality of first geographic grids and location information of the plurality of first geographic grids.

In exemplary aspects, in the determining of the plurality of first geographic grids related to the location of the terminal, the circuitry is further configured to, for at least one geographic grid of a plurality of geographic grids, determine the at least one geographic grid as one of the plurality of first geographic grids in a case that access point identifiers in access point information corresponding to the at least one geographic grid and access point identifiers in the target access point information include at least one same access point identifier.

In exemplary aspects, in the determining of the positioning sequence of the plurality of first geographic grids, the circuitry is further configured to generate a plurality of positioning samples according to the access point information corresponding to the plurality of first geographic grids and the target access point information. Each of the plurality of positioning samples corresponds to two of the plurality of first geographic grids. The circuitry determines the positioning sequence of the plurality of first geographic grids according to the plurality of positioning samples by using a specified ranker.

In exemplary aspects, in the generating of the plurality of positioning samples, the circuitry is further configured to determine positioning features of the first geographic grids according to the access point information corresponding to the first geographic grids and the target access point information, and, for any two of the plurality of first geographic grids, generate, according to positioning features of the two first geographic grids, a positioning sample corresponding to the two first geographic grids.

In exemplary aspects, before the determining of the positioning sequence of the plurality of first geographic grids, the circuitry is configured to obtain a plurality of first positioning requests. The plurality of first positioning requests includes access point information and location information. The circuitry generates a plurality of training samples according to access point information corresponding to the plurality of geographic grids, location information of the plurality of geographic grids, and the access point information and the location information that are carried in the plurality of first positioning requests. Each of the plurality of training samples corresponds to two of the plurality of geographic grids. The circuitry uses the plurality of training samples to train a to-be-trained ranking model to obtain the specified ranker.

In exemplary aspects, in the generating of the plurality of training samples, the circuitry is configured to select a first positioning request from the plurality of first positioning requests, and for each selected first positioning request the circuitry, for at least one of the plurality of geographic grids, determines the at least one geographic grid as a second geographic grid in a case that access point identifiers in access point information corresponding to the geographic grid and access point identifiers in access point information carried in the selected first positioning request comprise at least one same access point identifier. The circuitry determines, according to access point information corresponding to each of a plurality of determined second geographic grids and the access point information in the selected first positioning request, positioning features of the second geographic grids. For any two of the plurality of second geographic grids, the circuitry determines, according to location information of the any two second geographic grids and location information carried in the selected first positioning request, a category corresponding to the two second geographic grids. The circuitry generates, according to the category corresponding to the any two second geographic grids and positioning features of the two second geographic grids, a training sample corresponding to the two second geographic grids.

In exemplary aspects, the circuitry is further configured to obtain a plurality of second positioning requests, the plurality of second positioning requests including access point information and location information. The circuitry determines, according to the location information in the second positioning requests and the location information of the plurality of geographic grids, geographic grids to which the second positioning requests belong from the plurality of geographic grids. The circuitry determines, according to access point information in the second positioning requests belonging to the geographic grids, access point information corresponding to the geographic grids.

In exemplary aspects, in the determining of the location of the terminal, the circuitry is further configured to select a first n first geographic grids from the plurality of first geographic grids according to the positioning sequence of the plurality of first geographic grids, where n is a positive integer. The circuitry determines the location of the terminal according to location information of the n first geographic grids.

In exemplary aspects, a non-transitory computer-readable medium has computer-readable instructions stored thereon. The computer-readable instructions, when executed by a computer, cause the computer to perform a method including receiving a positioning request transmitted by a terminal. The positioning request includes target access point information obtained by the terminal. A plurality of geographic grids related to a location of the terminal is determined according to the target access point information. A positioning sequence of the plurality of first geographic grids is determined according to access point information corresponding to the plurality of first geographic grids and the target access point information. The positioning sequence indicates distances between the plurality of first geographic grids and the terminal. The location of the terminal is determined according to the positioning sequence of the plurality of first geographic grids and location information of the plurality of first geographic grids.

In exemplary aspects, in the determining of the positioning sequence of the plurality of first geographic grids a plurality of positioning samples is generated according to the access point information corresponding to the plurality of first geographic grids and the target access point information. Each of the plurality of positioning samples corresponds to two of the plurality of first geographic grids. The positioning sequence of the plurality of first geographic grids is determined according to the plurality of positioning samples by using a specified ranker.

In exemplary aspects, before the determining of the positioning sequence of the plurality of first geographic grids, a plurality of first positioning requests is obtained. The plurality of first positioning requests includes access point information and location information. A plurality of training samples are generated according to access point information corresponding to the plurality of geographic grids, location information of the plurality of geographic grids, and the access point information and the location information that are in the plurality of first positioning requests. Each of the plurality of training samples corresponds to two of the plurality of geographic grids. The plurality of training samples is used to train a to-be-trained ranking model to obtain the specified ranker.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1A:
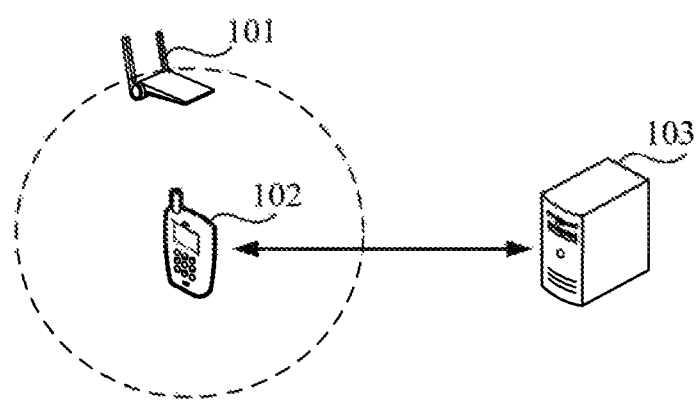
FIG. 1A is a schematic diagram of an involved system in which a positioning method according to an exemplary embodiment of the present disclosure is performed.

The following further describes the exemplary embodiments of the present disclosure in detail with reference to the accompanying drawings.

In an exemplary embodiment, during positioning using Wi-Fi hotspot locations, a server first simultaneously collects a plurality of pieces of Wi-Fi hotspot information on a plurality of different geographic coordinates, and then determines, according to the plurality of pieces of Wi-Fi hotspot information and the plurality of geographic coordinates, Wi-Fi hotspot locations corresponding to each piece of Wi-Fi hotspot information. During positioning, a terminal inserts the plurality of pieces of Wi-Fi hotspot information into a positioning request and transmits the positioning request to the server. The server then obtains Wi-Fi hotspot locations corresponding to each of the plurality of pieces of Wi-Fi hotspot information in the positioning request, and determines a location of the terminal according to the plurality of obtained Wi-Fi hotspot locations by using a triangulation positioning method.

In the foregoing positioning process, when the Wi-Fi hotspot locations corresponding to each piece of Wi-Fi hotspot information are determined at an earlier stage according to the plurality of pieces of Wi-Fi hotspot information and the plurality of geographic coordinates, and the determined Wi-Fi hotspot locations are estimated based on these values. At a later stage, the location of the terminal is determined according to the plurality of obtained Wi-Fi hotspot locations by using the triangulation positioning method which results in relatively low accuracy. Consequently, a final determined location of the terminal has a relatively large error, and positioning precision is relatively low.

In view of this, the exemplary embodiments of the present disclosure provide a positioning method, a positioning apparatus, a server, and a non-transitory computer-readable storage medium. According to the exemplary embodiments of the present disclosure, based on a positioning request transmitted by a terminal, a plurality of first geographic grids related to a location of the terminal are determined according to target access point information included in the positioning request. Then a positioning sequence of the plurality of first geographic grids is determined according to access point information corresponding to the plurality of first geographic grids and the target access point information. The location of the terminal is determined according to the positioning sequence of the plurality of first geographic grids and location information of the plurality of first geographic grids. Because the positioning sequence of the plurality of first geographic grids indicates distances between the plurality of first geographic grids and the terminal, the location of the terminal determined according to this method is accurate, and positioning precision is high.

Before the exemplary embodiments of the present disclosure are described in detail, terms, an application scenario, a system, and a system architecture involved in the exemplary embodiments of the present disclosure are described.

First, the terms of the exemplary embodiments of this application are described.

Access point information is information related to a Wi-Fi hotspot (or referred to as a wireless access point (AP)), and may include an access point identifier (such as a media access control (MAC) address and an access point name), a received signal strength indication (RSSI) value, and the like.

A geographic grid is a grid obtained by dividing spatial geographic information according to a certain area. That is, the surface of the earth is divided level by level based on ascending fineness, and approximate simulation is performed on the surface of the earth by using polygon grids having certain sizes, so as to integrate positioning of geographic space and descriptions of geographic features. Each geographic grid may be identified using a unique sequence number, and may be a longitude-latitude grid in actual application.

A location fingerprint associates a location in an actual environment with a certain "fingerprint". One location corresponds to one unique fingerprint. The fingerprint may be one-dimensional or multi-dimensional. Any feature helping distinguish locations can be used as a location fingerprint. For example, both a MAC address of an access point and an RSSI value of the access point that are detected in a location can be used as a location fingerprint.

Next, the application scenario of the exemplary embodiments of the present disclosure is described.

The exemplary embodiments of the present disclosure are applied to a positioning scenario, and may be specifically applied to a scenario in which a computing device such as a terminal performs positioning by using a location based service.

For example, when using a social application to post a social message, the terminal may first perform positioning on the terminal, to obtain location information of the terminal. Subsequently, the terminal may display the location information when posting the social message, so that other users learn a location of a user using the terminal.

For another example, when searching for nearby user equipment in a social application, the terminal may first perform positioning on the terminal, to obtain location information of the terminal. Subsequently, the terminal may determine the user equipment near the terminal according to the location information.

In addition to the foregoing scenario, the exemplary embodiments of the present disclosure may also be applied to other positioning scenarios, as one of ordinary skill will recognize. Thus, the positioning scenarios described herein are not limiting upon the present disclosure, and other positioning scenarios are possible without departing from the scope thereof.

A system according to the exemplary embodiments of the present disclosure is described next.

FIG. 1A is a schematic diagram of a system in which a positioning method according to an exemplary embodiment of the present disclosure is performed. Referring to FIG. 1A, the system may include: an access point 101, a terminal 102 and a positioning system 103.

The terminal 102 may scan the surrounding environment, and when the access point 101 is within a scanning range of the terminal 102, the terminal 102 may obtain access point information of the access point 101 through scanning. Subsequently, the terminal 102 may insert the access point information into a positioning request, and transmit the positioning request to the positioning system 103. After receiving the positioning request transmitted by the terminal 102, the positioning system 103 may determine a location of the terminal 102 according to the access point information in the positioning request, to implement positioning on the terminal 102.

The system architecture of the exemplary embodiments of the present application is described below.

Figure 1B:
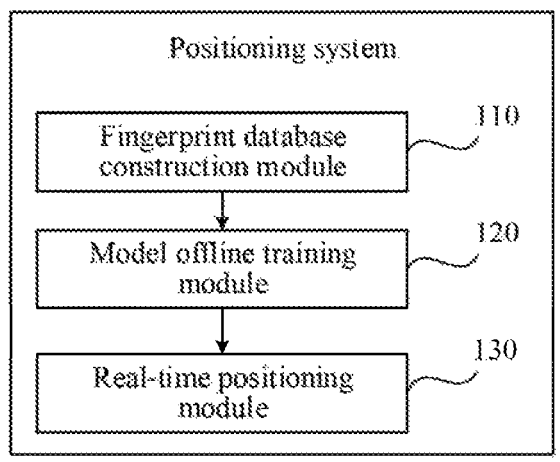
FIG. 1B is a schematic structural diagram of a positioning system according to an exemplary embodiment of the present disclosure.

FIG. 1B is a schematic structural diagram of a positioning system according to an exemplary embodiment of the present disclosure. The positioning system may be disposed in a computing device, such as a server. Referring to FIG. 1B, the positioning system may include: a fingerprint database construction module 110, a model offline training module 120, and a real-time positioning module 130.

The fingerprint database construction module 110 is described below.

The fingerprint database construction module 110 may construct a fingerprint database according to a plurality of second positioning requests carrying access point information and location information. The fingerprint database stores location fingerprints (mainly access point information in the embodiments of this application) corresponding to geographic grids.

Figure 1C:
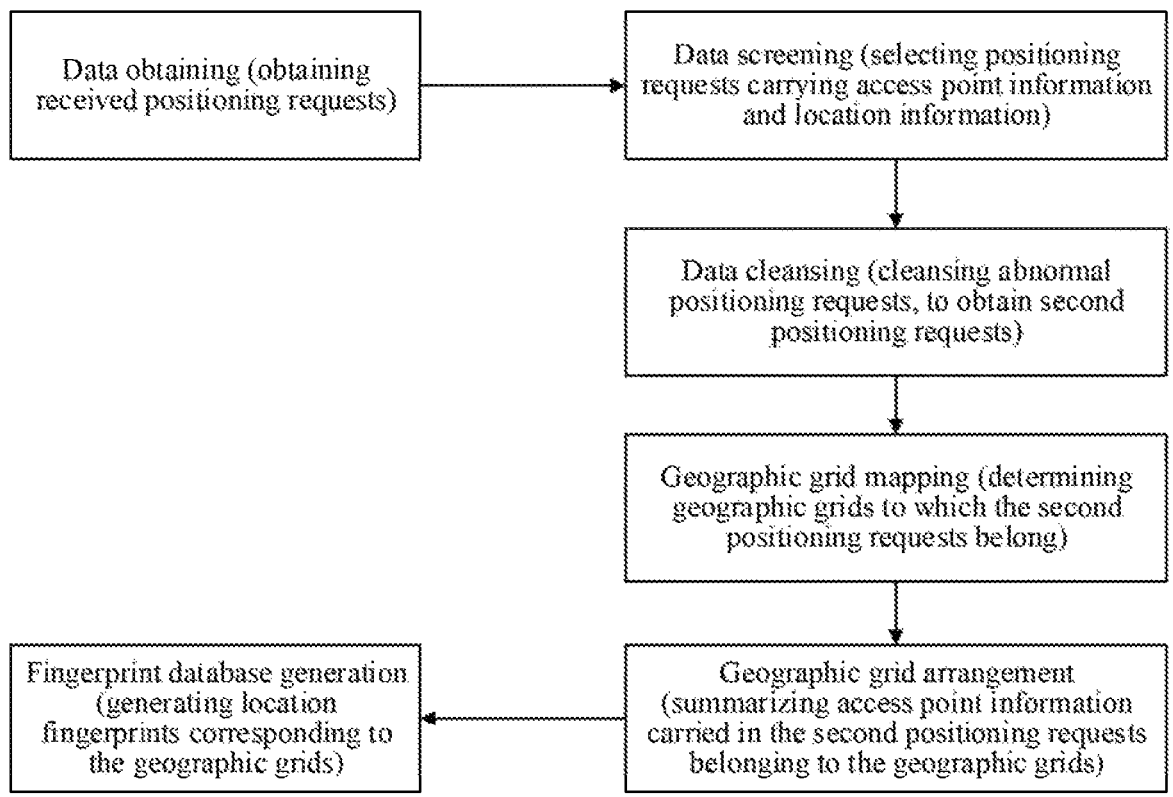
FIG. 1C is a schematic diagram of a fingerprint database construction module according to an exemplary embodiment of the present disclosure.

Referring to FIG. 1C, a process in which the fingerprint database construction module 110 constructs a fingerprint database may obtaining data, such as a plurality of received positioning request, in a first step. In a second step, the data is screened to select, from the plurality of obtained positioning requests, a plurality of positioning requests that include access point information and location information. In a third step, abnormal positioning requests are cleansed, or removed, from the plurality of selected positioning requests in order to obtain a plurality of second positioning requests. In a fourth step, geographic grids to which the second positioning requests belong are determined in order to perform geographic grid mapping. In a fifth step, access point information in the second positioning requests that belong to the geographic grids is summarized using geographic grid granularity. In a sixth step, location fingerprints corresponding to the geographic grids are generated according to geographic grid information obtained after the access point information is summarized and arranged. This forms the fingerprint database.

The model offline training module 120 is described below.

The model offline training module 120 may perform training according to a fingerprint database and a first positioning request that includes access point information and location information, to obtain a specified ranker. The specified ranker may determine, according to a positioning request transmitted by a terminal, a positioning sequence of a plurality of first geographic grids related to a location of the terminal. The positioning sequence is used to indicate distances between the plurality of first geographic grids and the terminal.

Figure 1D:
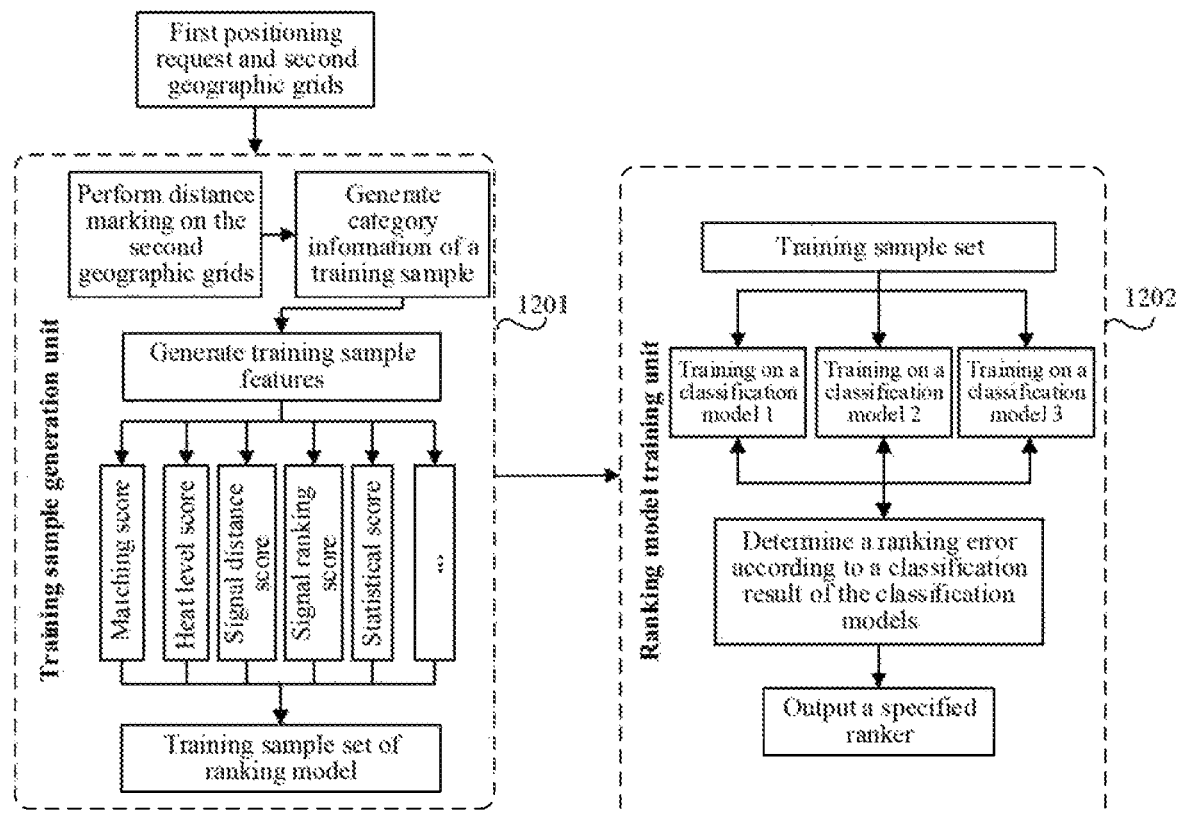
FIG. 1D is a schematic diagram of a model offline training module according to an exemplary embodiment of the present disclosure.

Referring to FIG. 1D, the model offline training module 120 may include a training sample generation unit 1201 and a ranking model training unit 1202. After the first positioning request is obtained and a plurality of second geographic grids related to the first positioning request are determined from the fingerprint database, the specified ranker may be obtained by using the training sample generation unit 1201 and the ranking model training unit 1202.

The training sample generation unit 1201 is configured to generate a plurality of training samples. Specifically, the generation process may include performing distance marking on the second geographic grids according to distances between a location indicated by the location information carried in the first positioning request and locations of the second geographic grids. In a second step, category information of a training sample corresponding to any two of the second geographic grids is generated based on distance marking information of the plurality of second geographic grids. In a third step, positioning features of the second geographic grids is generated based on the access point information in the first positioning request and access point information corresponding to the second geographic grids. Training sample features, such as a matching score, a heat level score, a signal distance score, a signal ranking score, a statistical score, and the like, are also generated in the third step. The training sample features are generated based on the positioning features of two second geographic grids corresponding to each of the training samples. In a fourth step, the plurality of training samples is output as a training sample set of a ranking model.

The ranking model training unit 1202 uses the training sample set to train a to-be-trained ranking model, to obtain the specified ranker. Specifically, the training process may include inputting the training sample set into a plurality of classification models included in the to-be-trained ranking model. For example, the classification models may include a classification mode 1, a classification model 2, and a classification model 3. In a second step, a ranking error is determined based on a classification result of the classification modes. In a third step, iterative training is performed on the plurality of classification models according to the ranking error until the ranking error is within a preset error range. In a fourth step, a combination of the plurality of classification models on which training is completed is output as the specified ranker.

The real-time positioning module 130 is described below.

Figure 1E:
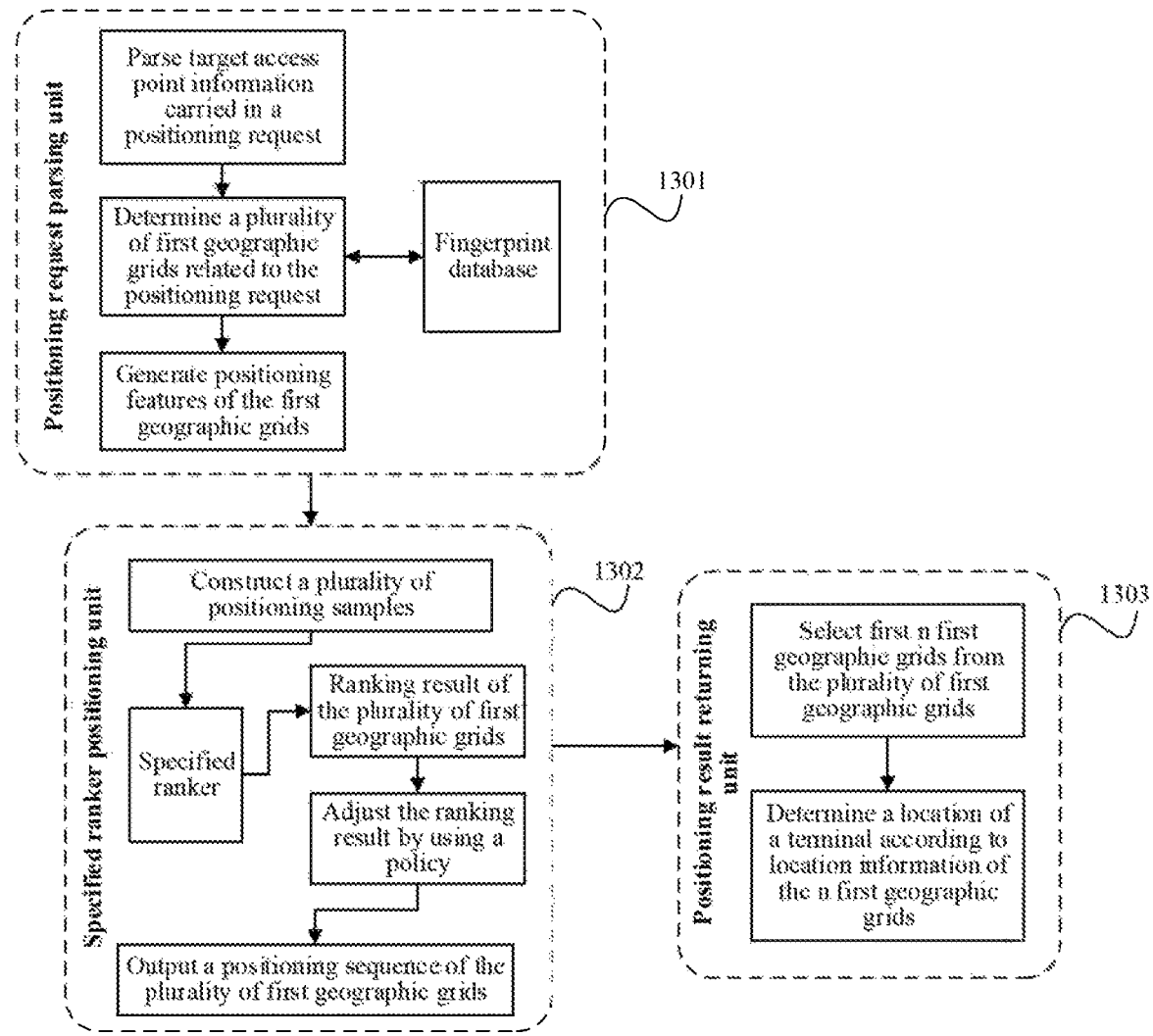
FIG. 1E is a schematic diagram of a real-time positioning module according to an exemplary embodiment of the present disclosure.

The real-time positioning module 130 may perform real-time positioning according to a fingerprint database and a specified ranker. Referring to FIG. 1E, the real-time positioning module 130 may include a positioning request parsing unit 1301, a specified ranker positioning unit 1302, and a positioning result returning unit 1303.

The positioning request parsing unit 1301 is configured to combine a received positioning request and location fingerprints stored in the fingerprint database, to obtain positioning features. Specifically, the combination process may include parsing, in a case of receiving a positioning request transmitted by a terminal, target access point information included in the positioning request as a first step. In a second step, a plurality of first geographic grids related to a location of the terminal are determined from location information of a plurality of geographic grids stored in the finger print database and according to the target access point information. In a third step, positioning features of the first geographic grids are generated according to access point information corresponding to the first geographic grids and the target access point information.

The specified ranker positioning unit 1302 is configured to determine a positioning sequence of the plurality of first geographic grids according to the positioning features of the plurality of first geographic grids by using the specified ranker. Specifically, the determining process may include, as a first step, constructing a plurality of positioning samples according to the positioning features of the plurality of first geographic grids. In a second step, the plurality of positioning samples is input into the specified ranker. The specified ranker outputs a ranking result of the plurality of first geographic grids. In a third step, a preset policy for performing adjustment on the ranking result of the plurality of first geographic grids is used to obtain the positioning sequence of the plurality of first geographic grids.

The positioning result returning unit 1303 is configured to determine the location of the terminal according to the positioning sequence of the plurality of first geographic grids and location information of the plurality of first geographic grids. Specifically, the determining process may include, as a first step, selecting a first n first geographic grids from the plurality of first geographic grids according to the positioning sequence of the plurality of geographic grids, wherein n is a positive integer, and, as a second step, determining the location of the terminal according to location information of the n first geographic grids.

As described above, in the exemplary embodiments of the present disclosure, before positioning is performed on a terminal, a fingerprint database may be first constructed, and a specified ranker is obtained through training according to the constructed fingerprint database, so that positioning can be subsequently performed on the terminal according to the fingerprint database and the specified ranker.

An exemplary construction process of the fingerprint database is described below.

Figure 2:
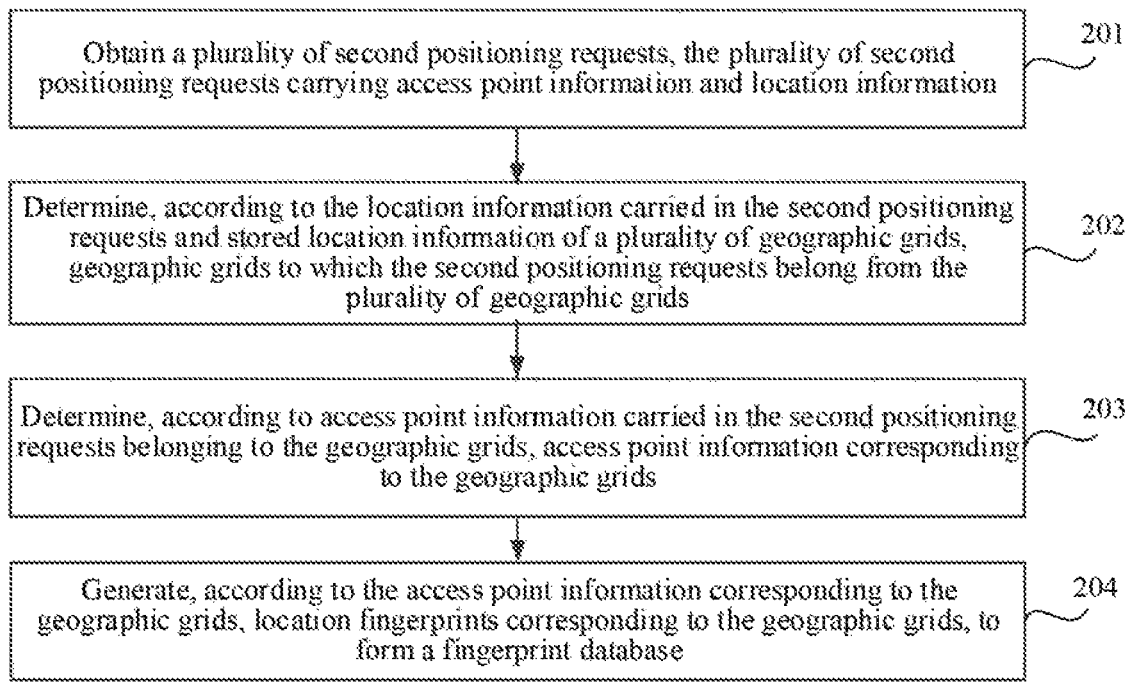
FIG. 2 is a flowchart of a fingerprint database construction operation according to an exemplary embodiment of the present disclosure.

FIG. 2 is a flowchart of a fingerprint database construction operation according to an exemplary embodiment of the present disclosure. The operation may be applied to a fingerprint database construction module included in a positioning system. Referring to FIG. 2, the operation includes the following.

In step 201, a plurality of second positioning requests is obtained. The plurality of second positioning requests includes access point information and location information.

Specifically, step 201 may include the following step (1) to step (3).

In step (1), a plurality of received positioning requests is obtained.

If terminals need to perform a positioning service, the terminals transmit positioning requests used for requesting positioning to a positioning system. The positioning system may store the positioning requests, so that a fingerprint database can be subsequently constructed according to the positioning requests.

In step (2), a plurality of positioning requests including access point information and location information are selected from the plurality of obtained positioning requests.

The positioning requests transmitted by the terminal are used for requesting to perform positioning on the terminals, and access point information and location information are not necessary in the positioning requests. In an exemplary application, the terminals can obtain location information only after using a GPS service or a base station positioning service. Therefore, the positioning requests may not include the location information. In addition, the terminals can obtain access point information only after scanning the surrounding environment. Therefore, the positioning requests may also not include the access point information. Because the fingerprint database needs to be constructed according to access point information and location information, screening needs to be performed on the plurality of obtained positioning requests, to select the positioning requests carrying the access point information and the location information and enter a subsequent process of constructing the fingerprint database. During an exemplary application, the location information may be GPS coordinates (latitude and longitude). However, other location information may also be used without departing from the scope of the present disclosure.

In step (3), abnormal positioning requests in the plurality of selected positioning requests are cleansed, or removed, to obtain a plurality of second positioning requests.

The abnormal positioning requests are dirty data in the plurality of selected positioning requests. That is, the abnormal positioning requests include abnormal location information, for example, abnormal location information caused by GPS drifting, Wi-Fi signal or base station signal abnormality, and the like.

In an exemplary application, whether a positioning request is an abnormal positioning request may be determined according to a moving speed value of a terminal carried in the positioning request. For example, when the moving speed value is greater than a preset speed value, it may be determined that the positioning request is an abnormal positioning request; and when the moving speed value is less than or equal to the preset speed value, it may be determined that the positioning request is not an abnormal positioning request. Whether a positioning request is an abnormal positioning request may also be determined using other measures and methods, and the measures and methods used to determine abnormal positioning request are not limiting upon the present disclosure In step 202, geographic grids to which the second positioning requests belong are determined based on the location information carried in the second positioning requests and location information of a plurality of geographic grids stored in the positioning system.

Specifically, for any geographic grid C of the plurality of geographic grids and any second positioning request A of the plurality of second positioning requests, when a location indicated by location information carried in the second positioning request A is within a location region indicated by location information included in the geographic grid C, the geographic grid C may be determined as a geographic grid to which the second positioning request A belongs.

Geographic grids to which the second positioning requests belong are determined from the plurality of geographic grids, so that mapping of the plurality of second positioning requests to the plurality of geographic grids may be completed, thereby facilitating subsequent summarization and arrangement performed on positioning data of each of the plurality of geographic grids according to the mapping.

In step 203, access point information corresponding to the geographic grids is determined according to access point information included in the second positioning requests belonging to the geographic grids.

In the exemplary embodiments of the present disclosure, summarization and arrangement are performed on the positioning data via a geographic grid that establishes granularity. In this case, the access point information corresponding to the geographic grids may include access point identifiers included in the second positioning requests belonging to the geographic grids, a number of times of the access point identifiers included in the second positioning requests, and the like.

In step 204, location fingerprints corresponding to the geographic grids are generated according to the access point information corresponding to the geographic grids. The finger prints form the fingerprint database.

The location fingerprints corresponding to the geographic grids may include information capable of being used for depicting location features of the geographic grids, such as the location information of the geographic grids, the access point information corresponding to the geographic grids, and grid sequence numbers of the geographic grids.

After the fingerprint database is constructed according to the foregoing step 201 to step 204, the constructed fingerprint database may be used for training to obtain a specified ranker.

An exemplary training operation of the specified ranker is described below.

Figure 3A:
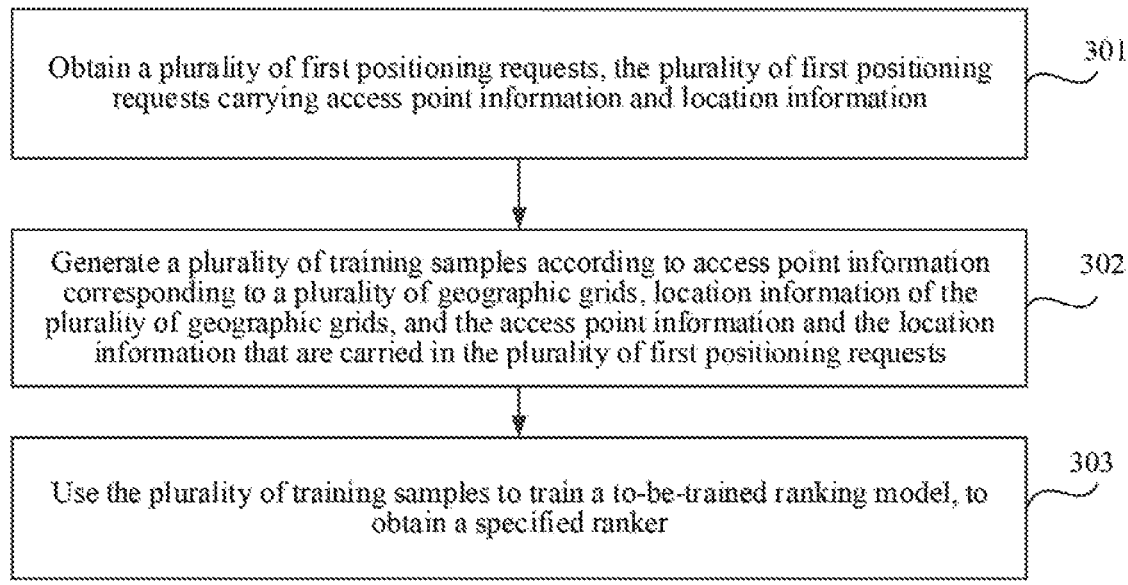
FIG. 3A is a flowchart of a training operation of a specified ranker according to an exemplary embodiment of the present disclosure.

FIG. 3A is a flowchart of a training operation of a specified ranker according to an exemplary embodiment of the present disclosure. The operation may be applied to a model offline training module in a positioning system. Referring to FIG. 3A, the operation includes the following steps.

In step 301, a plurality of first positioning requests is obtained. The plurality of first positioning requests includes access point information and location information.

During an exemplary application, the plurality of first positioning requests and the plurality of second positioning requests may be the same or may be different, and an operation for obtaining the plurality of first positioning requests is similar to the operation for obtaining the plurality of second positioning requests in the foregoing step 201.

In step 302, a plurality of training samples is generated according to access point information corresponding to a plurality of geographic grids, location information of the plurality of geographic grids, and the access point information and the location information that are carried in the plurality of first positioning requests.

Each of the plurality of training samples corresponds to two of the plurality of geographic grids. That is, any two of the plurality of geographic grids may correspond to one training sample.

Specifically, a first positioning request is selected from the plurality of first positioning requests, and processing of the following step (1) to step (4) is performed on the selected first positioning request until each of the plurality of first positioning requests is processed.

In step (1) and for any geographic grid B of the plurality of geographic grids, the geographic grid B is determined as a second geographic grid in a case that access point identifiers in access point information corresponding to the geographic grid B and access point identifiers in access point information in the selected first positioning request include at least one same access point identifier.

The second geographic grid is a geographic grid related to the selected first positioning request. That is, access point information corresponding to the second geographic grid is associated with the access point information in the selected first positioning request.

For example, if the access point information corresponding to the geographic grid B includes an access point identifier 1, an access point identifier 2, an access point identifier 3, and an access point identifier 4, and the access point information carried in the selected first positioning request includes an access point identifier 1 and an access point identifier 6, the access point identifiers in the access point information corresponding to the geographic grid B and the access point identifiers in the access point information carried in the selected first positioning request include at least one same access point identifier 1. In this case, the geographic grid B can be determined as a second geographic grid.

In step (2), positioning features of the second geographic grids are determined according to access point information corresponding to each of a plurality of determined second geographic grids and the access point information carried in the selected first positioning request.

The positioning features of the second geographic grids are used for representing location relevance statuses between the second geographic grids and a terminal transmitting the selected first positioning request.

Specifically, a second geographic grid may be selected from the plurality of second geographic grids, and the following process is performed on the selected second geographic grid until each of the plurality of second geographic grids is processed. Scores are determined for access point information corresponding to the selected second geographic grid and the access point information carried in the selected first positioning request in a plurality of dimensions, and the scores are used in the plurality of dimensions as elements for generating a positioning feature of the selected second geographic grid.

The plurality of dimensions may be set in advance. For example, the plurality of dimensions may include a matching degree, a heat level, a signal distance, signal ranking, and statistics, and are not limited in this embodiment of this application.

When the scores of the access point information corresponding to the selected second geographic grid and the access point information in the selected first positioning request are determined in the plurality of dimensions, a matching degree between access point identifiers included in the access point information corresponding to the selected second geographic grid and access point identifiers included in the access point information in the selected first positioning request may be determined, to obtain a matching score. Same access point identifiers existing in the access point information corresponding to the selected second geographic grid and the access point information in the selected first positioning request are determined, and a number of times the same access point identifiers are included in the first positioning requests is obtained from the access point information corresponding to the selected second geographic grid. A heat level score is determined according to the number of times the same access point identifiers are included in the first positioning requests. Receives signal strength indicator (RSSI) values corresponding to the same access point identifiers are obtained from the access point information in the selected first positioning request, and a signal distance score is determined according to the RSSI values. The same access point identifiers are ranked according to the RSSI values, and a signal ranking score is determined according to a ranking result of the same access point identifiers. A weighted average is performed on the foregoing obtained scores, to obtain a statistical score. En an exemplary application, scores of the access point information corresponding to the selected second geographic grid and the access point information in the selected first positioning request in other dimensions may also be determined. How the scores are determined and the scores used are not limiting upon the present disclosure as one of ordinary skill would recognize.

In step (3) and for any two of the plurality of second geographic grids, a category corresponding to the two second geographic grids are determined according to location information of the two second geographic grids and location information carried in the selected first positioning request.

The category corresponding to the two second geographic grids are used for indicating relative distances between the two second geographic grids and the terminal transmitting the selected first positioning request. If the category corresponding to the two second geographic grids is a first category, it may indicate that a distance between the former of the two geographic grids and the terminal is shorter than that between the latter of the two geographic grids and the terminal; and if the category corresponding to the two second geographic grids is a second category, it may indicate that a distance between the former of the two geographic grids and the terminal is longer than that between the tatter of the geographic grids and the terminal.

Specifically, respective distance marking information of the two second geographic grids may be determined according to the location information of the two second geographic grids and the location information in the selected first positioning request, and the category corresponding to the two second geographic grids may be determined according to the respective distance marking information of the two second geographic grids.

Distance marking information of a second geographic grid is used for marking a distance between a location of the second geographic grid and a location indicated by the location information in the selected first positioning request. For example, if distance marking information of a second geographic grid is first marking information, it may indicate that a distance between a location of the second geographic grid and the location indicated by the location information carried in the selected first positioning request is less than 30 m; if distance marking information of a second geographic grid is second marking information, it may indicate that a distance between a location of the second geographic grid and the location indicated by the location information in the selected first positioning request is greater than 30 m and less than 200 m; and if distance marking information of a second geographic grid is third marking information, it may indicate that a distance between a location of the second geographic grid and the location indicated by the location information in the selected first positioning request is greater than 200 m.

When the category corresponding to the two second geographic grids is determined according to the respective distance marking information of the two second geographic grids, in a case that a distance indicated by distance marking information of the former of the two second geographic grids is less than a distance indicated by distance marking information of the latter of the two second geographic grids, it may be determined that the category corresponding to the two second geographic grids is the first category; and in a case that the distance indicated by the distance marking information of the former of the two second geographic grids is greater than the distance indicated by the distance marking information of the latter of the two second geographic grids, it may be determined that the category corresponding to the two second geographic grids is the second category.

Figure 3B:
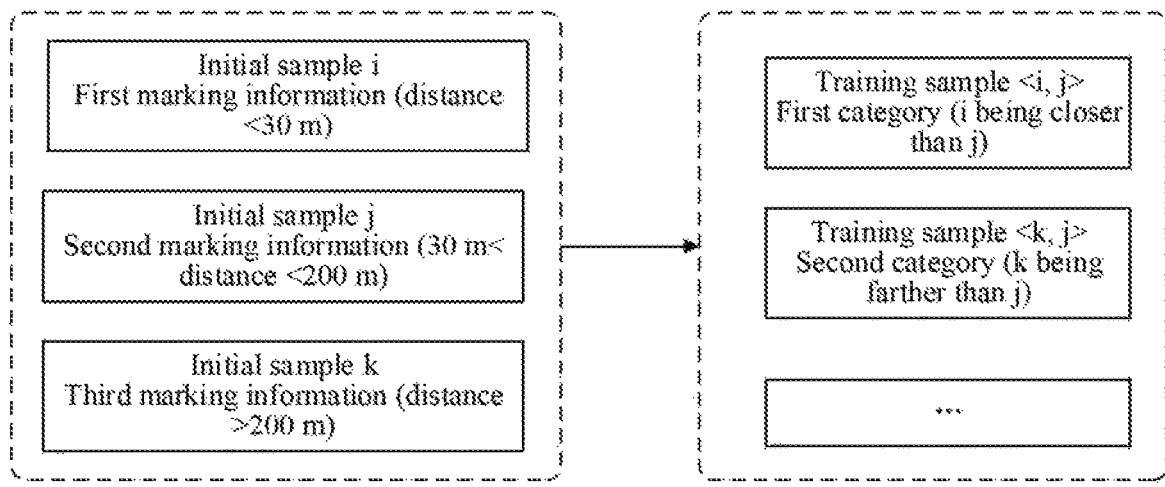
FIG. 3B is a schematic diagram of a process of determining categories of training samples according to an exemplary embodiment of the present disclosure.

For example, as shown in FIG. 3B, according to distances between locations of the plurality of second geographic grids and the location indicated by the location information in the selected first positioning request, the plurality of second geographic grids may be first marked by using different distance marking information, to obtain a plurality of initial samples. For example, all second geographic grids included in an initial sample i are marked by using first marking information; all second geographic grids included in an initial sample j are marked by using second marking information; and all second geographic grids included in an initial sample k are marked by using third marking information. Subsequently, a category corresponding to any two of the plurality of second geographic grids is determined according to the initial samples on which distance marking has been performed. For example, for any second geographic grid included in the initial sample i and any second geographic grid included in the initial sample j, a category corresponding to the two second geographic grids may be the first category, and for any second geographic grid included in the initial sample k and any second geographic grid included in the initial sample j, a category corresponding to the two second geographic grids may be the second category.

In step (4), a training sample corresponding to the two second geographic grids is generated according to the category corresponding to the two second geographic grids and positioning features of the two second geographic grids.

Specifically, a training sample feature may be determined according to the positioning features of the two second geographic grids, grid sequence numbers of the two second geographic grids in sequence may be used as a training sample name; and the category corresponding to the two second geographic grids may be used as a training sample category. Subsequently, a sample having the training sample feature, the training sample name, and the training sample category is generated and used as the training sample corresponding to the two second geographic grids.

After the training samples are obtained for the selected first positioning request, the training samples have training sample categories thereof. In this case, a distance sequence of the plurality of second geographic grids may be determined according to the obtained training sample categories of all the training samples. The distance sequence of the plurality of second geographic grids is used for indicating real distances between the plurality of second geographic grids and the terminal transmitting the selected first positioning request.

In addition, a category of the training sample may be set in advance. For example, the training sample may be a pair sample. The pair sample is a sample used in a case that a ranking model is trained by using a pairwise policy.

When the training sample feature is determined according to the positioning features of the two second geographic grids, respective positioning features of the two second geographic grids may be calculated, to obtain the training sample feature. The calculation may include adding, subtracting, and the like, and is not limited in this embodiment of this application.

In step 303, the plurality of training samples is used to train a to-be-trained ranking model, to obtain the specified ranker.

The ranking model may be a learning to rank (LTR) model. The ranking model may include a plurality of classification models, and a quantity of the plurality of classification models may be adjusted according to an actual requirement and a training effect. Each classification model may classify the training samples.

Specifically, the plurality of training samples may be used for training each of the plurality of classification models included in the to-be-trained ranking model. Each time training ends, a ranking error is determined according to a classification result of the plurality of classification models, and then iterative training is performed on the plurality of classification models according to the ranking error, until the ranking error is within a preset error range. Subsequently, a combination of the plurality of classification models on which training is completed is outputted as the specified ranker.

When the ranking error is determined according to the classification result of the plurality of classification models, for any classification model A of the plurality of classification models, a first ranking result of the plurality of second geographic grids may be determined according to a classification result of the classification model A; a second ranking result of the plurality of second geographic grids may be determined according to a plurality of determined first ranking results; and the second ranking result of the plurality of second geographic grids is compared with the distance sequence of the plurality of second geographic grids, to obtain the ranking error.

In this embodiment of this application, that the first ranking result of the plurality of second geographic grids is determined according to the classification result of the classification model A may be implemented according to the following method. A pair sample <a, b> includes two second geographic grids a and b. A label of the pair sample, that is, a category corresponding to the two second geographic grids included in the pair sample, is used for indicating relative distances between the two second geographic grids and the terminal transmitting the selected first positioning request. Pair samples are classified according to labels of the pair samples. According to a classification result, a relative distance between second geographic grids in the pair samples and the terminal transmitting the selected first positioning request may be learned. Classification results of all the pair samples are voted, and quantities of votes of all the second geographic grids may be learned. The quantities of votes are ranked to obtain the first ranking result of the plurality of second geographic grids.

Each classification model obtains a first ranking result, and a plurality of first ranking results are calculated according to a certain rule, to be added together; so that the second ranking result of the plurality of second geographic grids may be obtained.

After the specified ranker is obtained through training in the foregoing step 301 to step 303, positioning may be performed on the terminal by using the fingerprint database and the specified ranker.

The positioning method provided in the embodiments of this application is described below.

Figure 4:
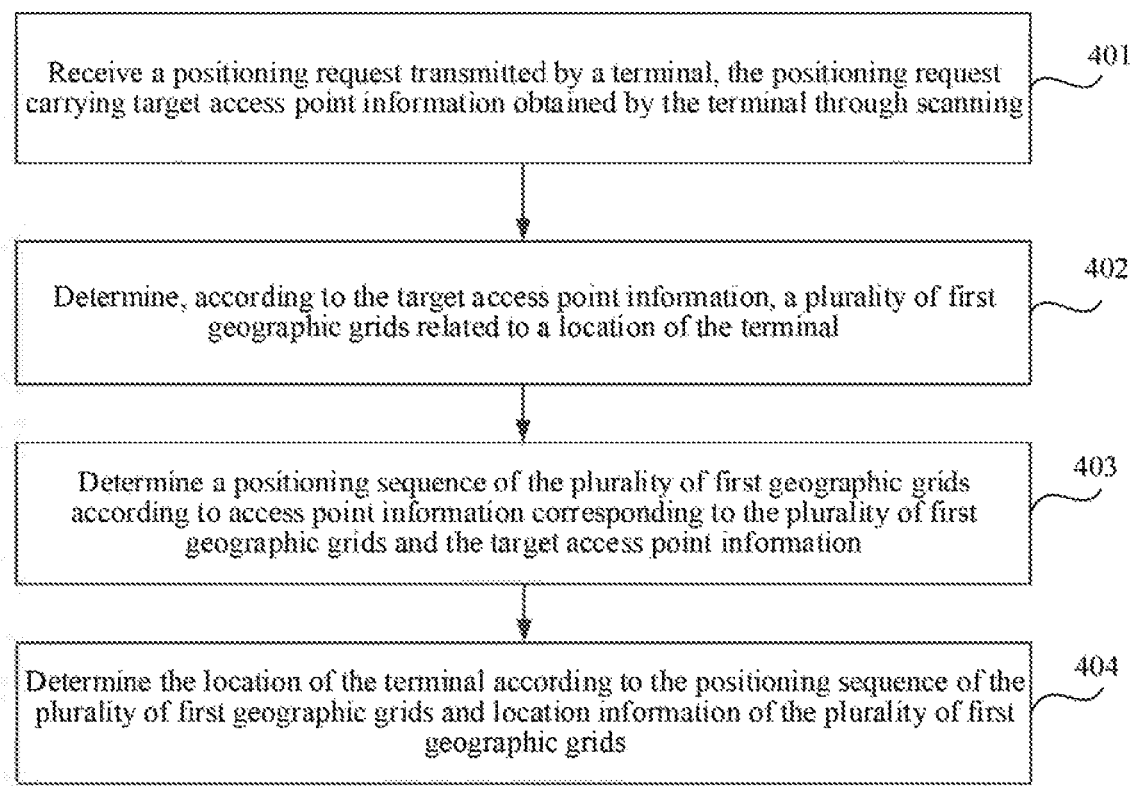
FIG. 4 is a flowchart of a positioning method according to an exemplary embodiment of the present disclosure.

FIG. 4 is a flowchart of a positioning method according to an exemplary embodiment of the present disclosure. The method may be applied to a real-time positioning module included in a positioning system and may include the following steps.

In step 401, a positioning request transmitted by a terminal is received. The positioning request includes target access point information obtained by the terminal through scanning.

If the terminal needs to perform a positioning service, the terminal may first scan the surrounding environment, to obtain target access point information related to access points in the surrounding environment, and includes the target access point information in the positioning request and transmits the positioning request to the positioning system, so that the positioning system may perform positioning on the terminal according to the target access point information.

In step 402, a plurality of first geographic grids related to a location of the terminal is determined according to the target access point information.

The plurality of first geographic grids includes geographic grids related to the location of the terminal. That is, access point information corresponding to the plurality of first geographic grids is associated with the target access point information.

Specifically, for any geographic grid A of a plurality of geographic grids, the geographic grid A is determined as a first geographic grid in a case that access point identifiers in access point information corresponding to the geographic grid A and access point identifiers in the target access point information include at least one same access point identifier.

For example, if the access point information corresponding to the geographic grid A includes an access point identifier 1, an access point identifier 2, an access point identifier 3, and an access point identifier 4, and the target access point information includes an access point identifier 3 and an access point identifier 6, among the access point identifiers in the access point information corresponding to the geographic grid A and the access point identifiers in the target access point information include at least one same access point identifier 3. In this case, the geographic grid A may be determined as a first geographic grid.

In an exemplary embodiment of the present disclosure, before the positioning request transmitted by the terminal is received in step 401, a fingerprint database may be constructed to determine the access point information corresponding to the plurality of geographic grids, and after the positioning request transmitted by the terminal is received in step 401, the fingerprint database may be constructed to determine the access point information corresponding to the plurality of geographic grids. Other methods of constructing the fingerprint database are also possible without departing from the scope of the present disclosure.

In step 403, a positioning sequence of the plurality of first geographic grids is determined according to the access point information corresponding to the plurality of first geographic grids and the target access point information.

The positioning sequence is used for indicating distances between the plurality of first geographic grids and the terminal. That is, in the positioning sequence, if a sequence number of a first geographic grid is smaller, the first geographic grid is closer to the terminal; and if a sequence number of a first geographic grid is larger, the first geographic grid is farther away from the terminal.

Specifically, a plurality of positioning samples are generated according to the access point information corresponding to the plurality of first geographic grids and the target access point information; and the positioning sequence of the plurality of first geographic grids is determined according to the plurality of positioning samples by using the specified ranker.

Each of the plurality of positioning samples corresponds to two of the plurality of first geographic grids. That is, any two of the plurality of first geographic grids may correspond to one positioning sample.

When the plurality of positioning samples are generated according to the access point information corresponding to the plurality of first geographic grids and the target access point information, positioning features of the first geographic grids may be determined according to the access point information corresponding to the first geographic grids and the target access point information. For any two of the plurality of first geographic grids, a positioning sample corresponding to the two first geographic grids is generated according to positioning features of the two first geographic grids.

The positioning features of the first geographic grids are used for representing location relevance statuses between the first geographic grids and the terminal.

The operation of determining the positioning features of the first geographic grids according to the access point information corresponding to the first geographic grids and the target access point information is similar to the operation of determining, according to access point information corresponding to each of a plurality of determined second geographic grids and the access point information carried in the selected first positioning request, positioning features of the second geographic grids in the foregoing step 302.

When the positioning sample corresponding to the two first geographic grids is generated according to the positioning features of the two first geographic grids, a positioning sample feature may be determined according to the positioning features of the two first geographic grids, and grid sequence numbers of the two first geographic grids in sequence are used as a positioning sample name. Subsequently, a sample having the positioning sample feature and the positioning sample name are generated as the positioning sample corresponding to the two first geographic grids.

A category of the positioning sample is the same as that of the foregoing training sample. For example, the positioning sample may be a pair sample.

In addition, the operation of determining the positioning sample feature according to the positioning features of the two first geographic grids is similar to the operation of determining the training sample feature according to the positioning features of the two second geographic grids in the foregoing step 302.

When the positioning sequence of the plurality of first geographic grids is determined according to the plurality of positioning samples by using the specified ranker, the plurality of positioning samples may be inputted into the specified ranker. Subsequently, a ranking result of the plurality of first geographic grids outputted by the specified ranker is directly used as the positioning sequence of the plurality of first geographic grids, or a preset policy may be used for adjusting a ranking result of the plurality of first geographic grids outputted by the specified ranker, to obtain the positioning sequence of the plurality of first geographic grids.

The preset policy may be set in advance. For example, the preset policy may be: when a preset geographic grid 1 is ranked in front of a preset geographic grid 2 in the ranking result of the plurality of first geographic grids, adjusting the preset geographic grid 1 to be behind the preset geographic grid 2. In an exemplary application, other policies for performing sequence adjustment may also be used. Therefore, the preset policy used is not limiting upon the present disclosure.

In step 404, the location of the terminal is determined according to the positioning sequence of the plurality of first geographic grids and location information of the plurality of first geographic grids.

Specifically, the first n first geographic grids may be selected from the plurality of first geographic grids according to the positioning sequence of the plurality of first geographic grids; and the location of the terminal may be determined according to location information of the n first geographic grids.

When the location of the terminal is determined according to the location information of the n first geographic grids, a normal average or a weighted average may be performed on location coordinates included in the location information of the n first geographic grids, to obtain target location coordinates; and a location indicated by the target location coordinates is determined as the location of the terminal.

In an exemplary embodiment of the present disclosure, after a positioning request transmitted by a terminal is received, a plurality of first geographic grids related to a location of the terminal may be first determined according to target access point information carried in the positioning request; a positioning sequence of the plurality of first geographic grids may be then determined according to access point information corresponding to the plurality of first geographic grids and the target access point information; and the location of the terminal may be determined according to the positioning sequence of the plurality of first geographic grids and location information of the plurality of first geographic grids. Because the positioning sequence of the plurality of first geographic grids may indicate distances between the plurality of first geographic grids and the terminal, the location of the terminal determined according to this method is accurate, and positioning precision is high.

The positioning apparatus provided in the exemplary embodiments of the present disclosure is described below in detail.

Figure 5A:
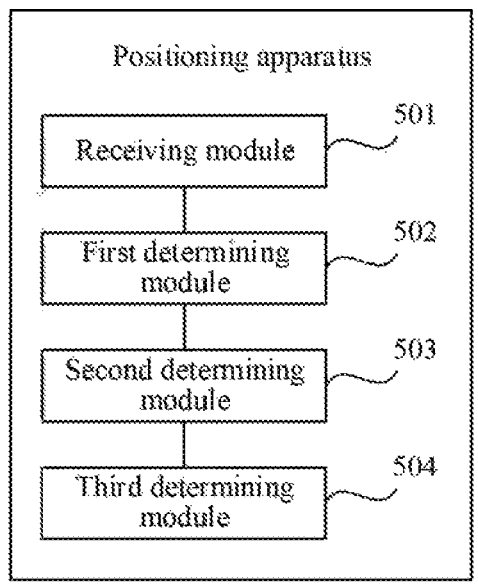
FIG. 5A is a schematic structural diagram of a positioning apparatus according to an exemplary embodiment of the present disclosure.

FIG. 5A is a schematic structural diagram of a positioning apparatus according to an exemplary embodiment of the present disclosure. Referring to FIG. 5A, the apparatus includes circuitry, such as a receiving module 501, a first determining module 502, a second determining module 503, and a third determining module 504.

The receiving module 501 includes circuitry to receive a positioning request transmitted by a terminal. As noted above, the positioning request includes target access point information obtained by the terminal through scanning.

The first determining module 502 includes circuitry to determine, according to the target access point information, a plurality of first geographic grids related to a location of the terminal.

The second determining module 503 includes circuitry to determine a positioning sequence of the plurality of first geographic grids according to access point information corresponding to the plurality of first geographic grids and the target access point information. The positioning sequence is used for indicating distances between the plurality of first geographic grids and the terminal.

The third determining module 504 includes circuitry to determine the location of the terminal according to the positioning sequence of the plurality of first geographic grids and location information of the plurality of first geographic grids.

In an exemplary embodiment of the present disclosure, the circuitry of the first determining module 502 is configured to, for any geographic grid A of the plurality of geographic grids, determine the geographic grid A as a first geographic grid in a case that access point information corresponding to the geographic grid A and the target access point information include at least one same access point identifier.

Figure 5B:
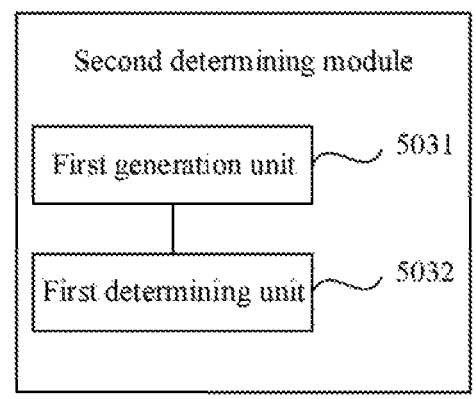
FIG. 5B is a schematic structural diagram of a second determining module according to an exemplary embodiment of the present disclosure.

In an exemplary embodiment of this application, as shown in FIG. 5B, the second determining module 503 includes a first generation unit 5031 that has circuitry configured to generate a plurality of positioning samples according to the access point information corresponding to the plurality of first geographic grids and the target access point information, each of the plurality of positioning samples corresponds to two of the plurality of first geographic grids. The second determining module 503 also includes a first determining unit 5032 having circuitry configured to determine the positioning sequence of the plurality of first geographic grids according to the plurality of positioning samples by using a specified ranker.

In an exemplary embodiment of the present disclosure, the first generation unit 5031 includes circuitry configured to determine positioning features of the first geographic grids according to the access point information corresponding to the first geographic grids and the target access point information, and for any two of the plurality of first geographic grids, generate, according to positioning features of the two first geographic grids, a positioning sample corresponding to the two first geographic grids.

Figure 5C:
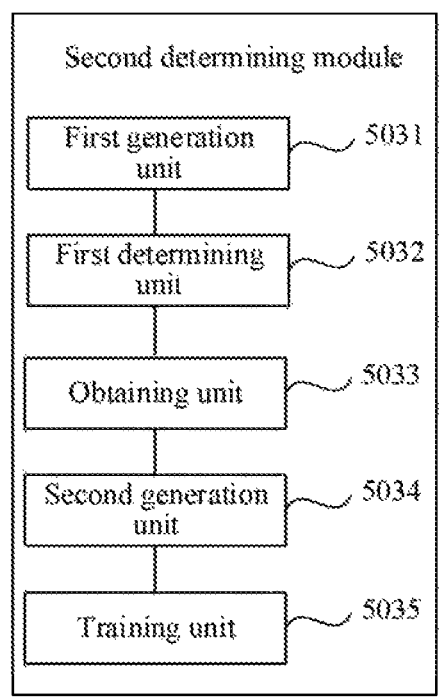
FIG. 5C is a schematic structural diagram of a second determining module according to another exemplary embodiment of the present disclosure.

In an exemplary embodiment of the present disclosure, as shown in FIG. 5C, the second determining module 503 further includes an obtaining unit 5033 having circuitry configured to obtain a plurality of first positioning requests, the plurality of first positioning requests carrying access point information and location information. The second determining module 503 also includes a second generation unit 5034 having circuitry configured to generate a plurality of training samples according to access point information corresponding to the plurality of geographic grids, location information of the plurality of geographic grids, and the access point information and the location information that are carried in the plurality of first positioning requests, each of the plurality of training samples corresponding to two of the plurality of geographic grids, and a training unit 5035 having circuitry configured to use the plurality of training samples to train a to-be-trained ranking model, to obtain the specified ranker.

In an exemplary embodiment of the present disclosure, the second generation unit 5034 includes circuitry configured to select a first positioning request from the plurality of first positioning requests, and perform the following processing on the selected first positioning request until each of the plurality of first positioning requests is processed, and for any geographic grid B of the plurality of geographic grids, determine the geographic grid B as a second geographic grid in a case that access point identifiers in access point information corresponding to the geographic grid B and access point identifiers in access point information in the selected first positioning request include at least one same access point identifier. The circuitry is also configured to determine, according to access point information corresponding to each of a plurality of determined second geographic grids and the access point information in the selected first positioning request, positioning features of the second geographic grids, and for any two of the plurality of second geographic grids, determine, according to location information of the two second geographic grids and location information in the selected first positioning request, a category corresponding to the two second geographic grids. The circuitry is further configured to generate, according to the category corresponding to the two second geographic grids and positioning features of the two second geographic grids, a training sample corresponding to the two second geographic grids.

Figure 5D:
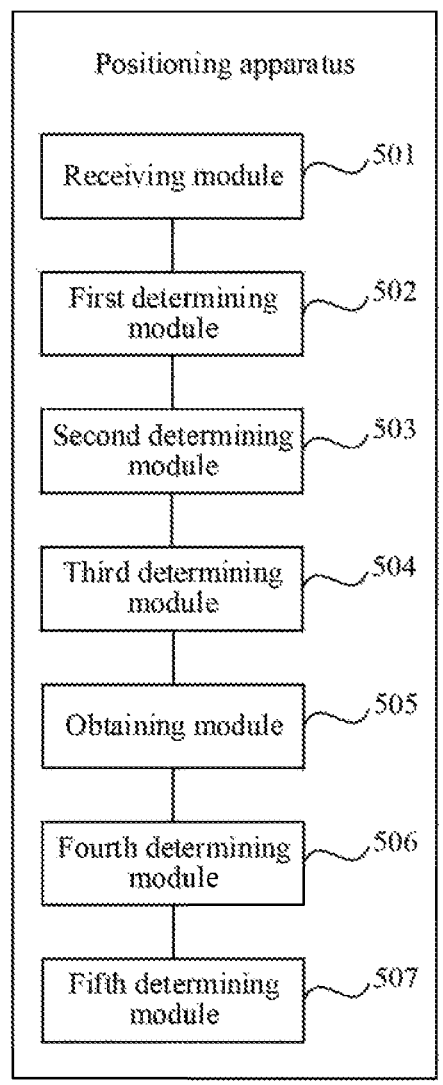
FIG. 5D is a schematic structural diagram of a positioning apparatus according to another exemplary embodiment of the present disclosure.
Figure 5E:
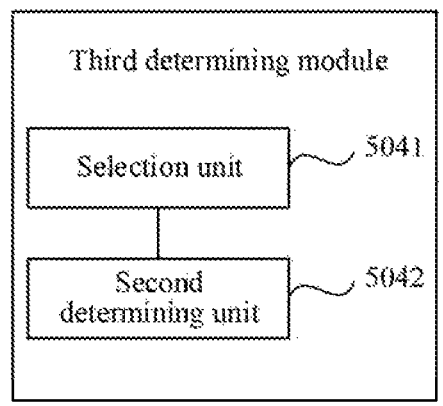
FIG. 5E is a schematic structural diagram of a third determining module according to an exemplary embodiment of the present disclosure.

In an exemplary embodiment of the present disclosure, as shown in FIG. 5D, the apparatus further includes an obtaining module 505 including circuitry configured to obtain a plurality of second positioning requests. The plurality of second positioning requests including access point information and location information. The apparatus also includes a fourth determining module 506 having circuitry configured to determine, according to the location information in the second positioning requests and the location information of the plurality of geographic grids, geographic grids to which the second positioning requests belong from the plurality of geographic grids, and a fifth determining module 507 having circuitry configured to determine, according to access point information in the second positioning requests belonging to the geographic grids, access point information corresponding to the geographic grids.

In an exemplary embodiment of the present disclosure, after a positioning request transmitted by a terminal is received, a plurality of first geographic grids related to a location of the terminal may be first determined according to target access point information in the positioning request; a positioning sequence of the plurality of first geographic grids may be then determined according to access point information corresponding to the plurality of first geographic grids and the target access point information; and the location of the terminal may be determined according to the positioning sequence of the plurality of first geographic grids and location information of the plurality of first geographic grids. Because the positioning sequence of the plurality of first geographic grids may indicate distances between the plurality of first geographic grids and the terminal, the location of the terminal determined according to this method is accurate, and positioning precision is high.

When the positioning apparatus provided in the foregoing exemplary embodiments performs positioning, division of the foregoing modules is merely used as an example for clarity of the description. As one of ordinary skill would recognize, the foregoing functions may be allocated to and performed by different modules, or may be combined and performed by fewer that the above-described modules. The functions may also be further divided in order to be performed by more than the above-described modules. As such, the above describes are merely exemplary and not limiting upon the present disclosure. That is, the internal structure of the apparatus is divided into different functional modules, to perform all or some functions in the foregoing descriptions. In addition, the positioning apparatus provided in the foregoing exemplary embodiments correspond to the exemplary embodiments of the positioning method. Therefore, the descriptions with respect to these exemplary embodiments may be combined without limitation.

Figure 6:
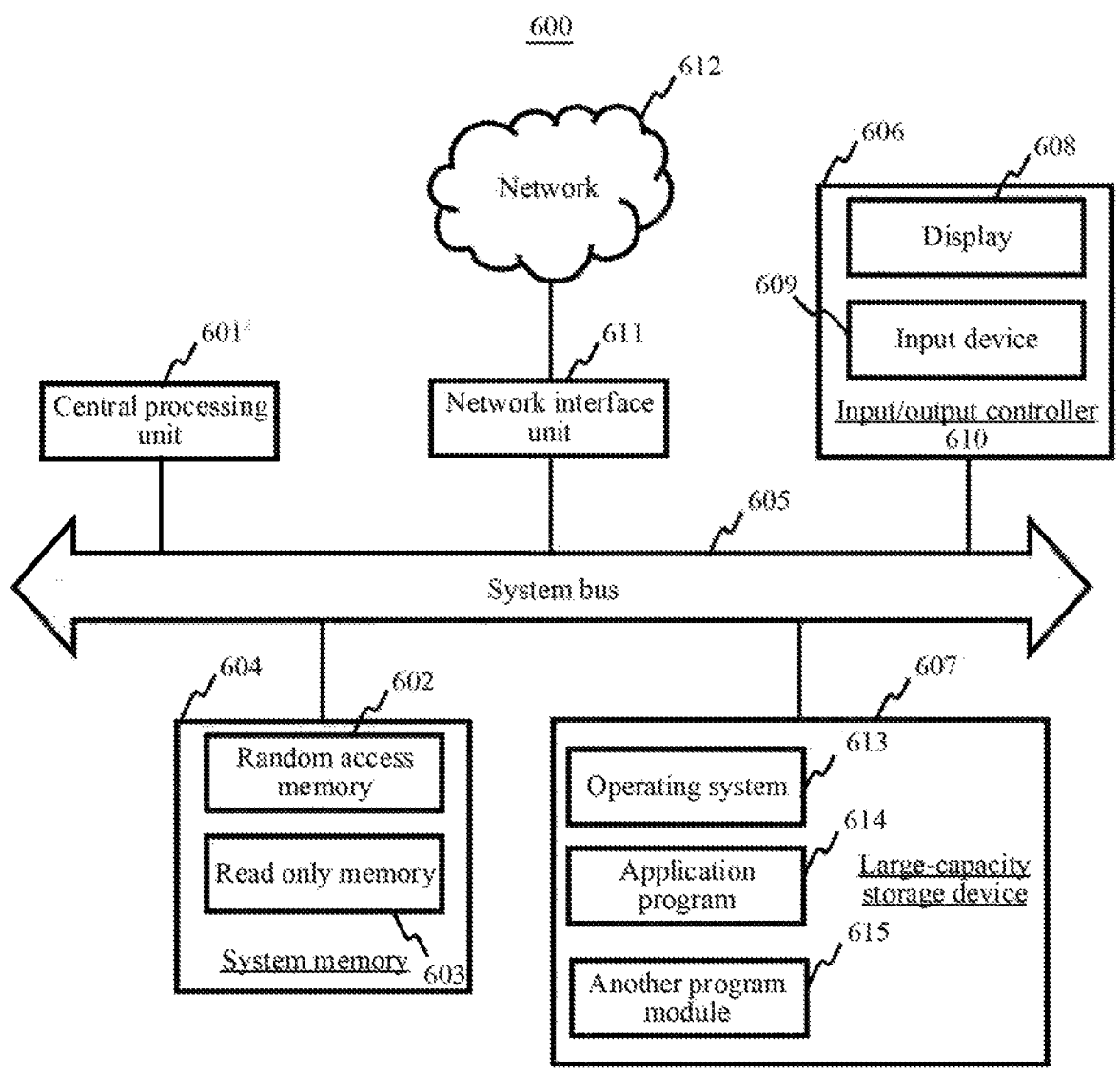
FIG. 6 is a schematic structural diagram of another positioning apparatus according to an exemplary embodiment of the present disclosure.

FIG. 6 is a schematic structural diagram of a positioning apparatus according to an exemplary embodiment of this application. The apparatus may be a computing device, for example, a server 600. The server 600 may be a server in a backend server cluster.

Specifically, the server 600 includes circuitry, such as a central processing unit (CPU) 601, a system memory 604 including non-transitory computer-readable media, such as a random access memory (RAM) 602 and a read only memory (ROM) 603, and a system bus 605 connecting the system memory 604 and the CPU 601. The server 600 further includes an input/output system (I/O) system) 606 assisting in transmitting information between devices in a computer, and a non-transitory computer-readable medium, such as a large-capacity storage device 607 configured to store an operating system 613, an application program 614, and another program module 615.

The basic I/O system 606 includes a display 608 configured to display information, and an input device 609 configured to enter information by a user, such as a mouse and a keyboard. The display 608 and the input device 609 are both connected to the CPU 601 by using an input/output controller 610 that is connected to the system bus 605. The basic I/O system 606 may further include the input/output controller 610 to be configured to receive and process input from a plurality of other devices such as a keyboard, a mouse, and an electronic stylus. Similarly, the input/output controller 610 further provides output to a display screen, a printer, or another type of output device.

The large-capacity storage device 607 is connected to the CPU 601 by using a large-capacity storage controller (not shown) connected to the system bus 605. The large-capacity storage device 607 and its associated computer-readable medium provide non-volatile storage for the server 600. That is, the large-capacity storage device 607 may include the non-transitory computer-readable medium (not shown) such as a hard disk or a CD-ROM driver.

Generally, the non-transitory computer-readable medium may include a computer storage medium and a communications medium. The computer storage medium includes volatile, non-volatile, removable, and non-removable media implemented by using any method or technology used for storing information such as a computer-readable instruction, a data structure, a program module, or other data. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. As can be appreciated, the computer storage medium is not limited to the foregoing several types and other computer storage media are possible without departing from the scope of the present disclosure. The system memory 604 and the large-capacity storage device 607 may also be collectively referred to as memories.

According to various exemplary embodiments of the present disclosure, the server 600 may further be connected, through a network such as the Internet, to a remote computer on the network. That is, the server 600 may be connected to a network 612 by using a network interface unit 611 connected to the system bus 605, or may be connected to another type of network or remote computer system (not shown) by using a network interface unit 611.

The memory, which is an example of a non-transitory computer-readable medium, further includes one or more programs, which are stored in the memory and are configured to be executed by the CPU. The one or more programs include instructions used for performing the positioning method provided in the foregoing exemplary embodiments.

A person of ordinary skill in the art will recognize, all or some of the steps of the foregoing embodiments may be implemented by using hardware, or may be implemented by a program instructing relevant hardware. The program may be stored in a non-transitory computer-readable storage medium, which may be a ROM, a magnetic disk, an optical disc, or the like.

Numerous modifications and variations of the present disclosure are possible in light of the above teachings. It is therefore to be understood that within the scope of the appended claims, the embodiments of the present disclosure may be practiced otherwise than as specifically described herein.

What is claimed is:

1. A positioning method, performed by a computing device, the method comprising:
    receiving, by circuitry of the computing device, a positioning request transmitted by a terminal, the positioning request including target access point information obtained by the terminal;
    determining, by the circuitry and according to the target access point information, a plurality of first geographic grids related to a location of the terminal;
    determining, by the circuitry, a plurality of positioning samples according to access point information corresponding to the plurality of first geographic grids and the target access point information, each of the plurality of positioning samples corresponding to two of the plurality of first geographic grids;

determining, by the circuitry, a positioning sequence of the plurality of first geographic grids according to the plurality of positioning samples, the positioning sequence being ordered according to distances between the plurality of first geographic grids and the terminal; and determining, by the circuitry, the location of the terminal according to the positioning sequence of the plurality of first geographic grids and location information of the plurality of first geographic grids.

2. The method according to claim 1, wherein the determining the plurality of first geographic grids related to the location of the terminal comprises:

for at least one geographic grid of a plurality of geographic grids, determining the at least one geographic grid as one of the plurality of first geographic grids based on access point identifiers in access point information corresponding to the at least one geographic grid and access point identifiers in the target access point information including at least one same access point identifier.

3. The method according to claim 1, wherein the determining the positioning sequence of the plurality of first geographic grids comprises:

determining the positioning sequence of the plurality of first geographic grids according to the plurality of positioning samples by using a specified ranker.

4. The method according to claim 1, wherein the determining the plurality of positioning samples comprises:

determining positioning features of the first geographic grids according to the access point information corresponding to the first geographic grids and the target access point information, the positioning features being based on scores determined for the access point information in a plurality of dimensions; and for every two of the plurality of first geographic grids, determining according to the positioning features of the every two first geographic grids, a positioning sample corresponding to the every two first geographic grids.

5. The method according to claim 3, wherein before the determining of the positioning sequence of the plurality of first geographic grids, the method further comprises:

obtaining a plurality of first positioning requests, the plurality of first positioning requests including access point information and location information;

generating a plurality of training samples according to access point information corresponding to a plurality of geographic grids, location information of the plurality of geographic grids, and the access point information and the location information that are carried in the plurality of first positioning requests, each of the plurality of training samples corresponding to two of the plurality of geographic grids; and using the plurality of training samples to train a to-be-trained ranking model to obtain the specified ranker.

6. The method according to claim 5, wherein the generating the plurality of training samples comprises:

selecting a first positioning request from the plurality of first positioning requests;

for at least one of the plurality of geographic grids, determining the at least one geographic grid as a second geographic grid based on access point identifiers in access point information corresponding to the geographic grid and access point identifiers in access point information carried in the selected first positioning request including at least one same access point identifier;

determining, according to access point information corresponding to each of the plurality of determined second geographic grids and the access point information in the selected first positioning request, positioning features of the second geographic grids;

for every two of the plurality of second geographic grids, determining, according to location information of the every two second geographic grids and location information carried in the selected first positioning request, a category corresponding to the every two second geographic grids; and generating, according to the category corresponding to the every two second geographic grids and positioning features of the every two second geographic grids, a training sample corresponding to the every two second geographic grids.

7. The method according to claim 2, further comprising:

obtaining a plurality of second positioning requests, the plurality of second positioning requests including access point information and location information;

determining, according to the location information in the second positioning requests and the location information of the plurality of geographic grids, geographic grids to which the second positioning requests belong from the plurality of geographic grids; and determining, according to access point information in the second positioning requests belonging to the geographic grids, access point information corresponding to the geographic grids.

8. The method according to claim 1, wherein the determining the location of the terminal comprises:

selecting a first n first geographic grids from the plurality of first geographic grids according to the order of the positioning sequence of the plurality of first geographic grids, n being a positive integer; and determining the location of the terminal according to location information of the n first geographic grids.

9. The method according to claim 1, wherein the terminal obtains the target access point information through scanning.

10. A positioning apparatus, comprising:

circuitry configured to receive a positioning request transmitted by a terminal, the positioning request including target access point information obtained by the terminal;

determine, according to the target access point information, a plurality of first geographic grids related to a location of the terminal;

determine a plurality of positioning samples according to access point information corresponding to the plurality of first geographic grids and the target access point information, each of the plurality of positioning samples corresponding to two of the plurality of first geographic grids;

determine a positioning sequence of the plurality of first geographic grids according to the plurality of positioning samples, the positioning sequence being ordered according to distances between the plurality of first geographic grids and the terminal; and determine the location of the terminal according to the positioning sequence of the plurality of first geographic grids and location information of the plurality of first geographic grids.

11. The positioning apparatus according to claim 10, wherein to determine the plurality of first geographic grids related to the location of the terminal, the circuitry is further configured to:
  for at least one geographic grid of a plurality of geographic grids, determine the at least one geographic grid as one of the plurality of first geographic grids based on access point identifiers in access point information corresponding to the at least one geographic grid and access point identifiers in the target access point information including at least one same access point identifier.

12. The positioning apparatus according to claim 10, wherein to determine the positioning sequence of the plurality of first geographic grids, the circuitry is further configured to:
  determine the positioning sequence of the plurality of first geographic grids according to the plurality of positioning samples by using a specified ranker.

13. The positioning apparatus according to claim 10, wherein to determine the plurality of positioning samples, the circuitry is further configured to:
  determine positioning features of the first geographic grids according to the access point information corresponding to the first geographic grids and the target access point information, the positioning features being based on scores determined for the access point information in a plurality of dimensions; and
  for every two of the plurality of first geographic grids, determine, according to the positioning features of the every two first geographic grids, a positioning sample corresponding to the every two first geographic grids.

14. The positioning apparatus according to claim 12, wherein before the positioning sequence of the plurality of first geographic grids is determined, the circuitry is configured to:
  obtain a plurality of first positioning requests, the plurality of first positioning requests including access point information and location information;
  generate a plurality of training samples according to access point information corresponding to a plurality of geographic grids, location information of the plurality of geographic grids, and the access point information and the location information that are carried in the plurality of first positioning requests, each of the plurality of training samples corresponding to two of the plurality of geographic grids; and
  use the plurality of training samples to train a to-be-trained ranking model to obtain the specified ranker.

15. The positioning apparatus according to claim 14, wherein to generate the plurality of training samples, the circuitry is configured to:
  select a first positioning request from the plurality of first positioning requests;
  for at least one of the plurality of geographic grids, determine the at least one geographic grid as a second geographic grid based on access point identifiers in access point information corresponding to the geographic grid and access point identifiers in access point information carried in the selected first positioning request including at least one same access point identifier;
  determine, according to access point information corresponding to each of the plurality of determined second geographic grids and the access point information in the selected first positioning request, positioning features of the second geographic grids;
  for every two of the plurality of second geographic grids, determine, according to location information of the every two second geographic grids and location information carried in the selected first positioning request, a category corresponding to the every two second geographic grids; and
  generate, according to the category corresponding to the every two second geographic grids and positioning features of the every two second geographic grids, a training sample corresponding to the every two second geographic grids.

16. The positioning apparatus according to claim 11, wherein the circuitry is further configured to:
  obtain a plurality of second positioning requests, the plurality of second positioning requests including access point information and location information;
  determine, according to the location information in the second positioning requests and the location information of the plurality of geographic grids, geographic grids to which the second positioning requests belong from the plurality of geographic grids; and
  determine, according to access point information in the second positioning requests belonging to the geographic grids, access point information corresponding to the geographic grids.

17. The positioning apparatus according to claim 10, wherein to determine the location of the terminal, the circuitry is further configured to:
  select a first n first geographic grids from the plurality of first geographic grids according to the order of the positioning sequence of the plurality of first geographic grids, n being a positive integer; and
  determine the location of the terminal according to location information of the n first geographic grids.

18. A non-transitory computer-readable medium having computer-readable instructions stored thereon, the computer-readable instructions, when executed by a computer, cause the computer to perform a method comprising:
  receiving a positioning request transmitted by a terminal, the positioning request including target access point information obtained by the terminal;
  determining, according to the target access point information, a plurality of first geographic grids related to a location of the terminal;
  determining a plurality of positioning samples according to access point information corresponding to the plurality of first geographic grids and the target access point information, each of the plurality of positioning samples corresponding to two of the plurality of first geographic grids;
  determining a positioning sequence of the plurality of first geographic grids according to the plurality of positioning samples, the positioning sequence being ordered according to distances between the plurality of first geographic grids and the terminal; and
  determining the location of the terminal according to the positioning sequence of the plurality of first geographic grids and location information of the plurality of first geographic grids.

19. The non-transitory computer-readable medium according to claim 18, the method further comprising, in the determining of the positioning sequence of the plurality of first geographic grids:
  determining the positioning sequence of the plurality of first geographic grids according to the plurality of positioning samples by using a specified ranker.

20. The non-transitory computer-readable medium according to claim 19, the method further comprising, before the determining of the positioning sequence of the plurality of first geographic grids:
- obtaining a plurality of first positioning requests, the plurality of first positioning requests including access point information and location information;
- generating a plurality of training samples according to access point information corresponding to a plurality of geographic grids, location information of the plurality of geographic grids, and the access point information and the location information that are carried in the plurality of first positioning requests, each of the plurality of training samples corresponding to two of the plurality of geographic grids; and
- using the plurality of training samples to train a to-be-trained ranking model to obtain the specified ranker.

* * * * *